(12) United States Patent
Waggoner

(10) Patent No.: US 6,318,952 B1
(45) Date of Patent: Nov. 20, 2001

(54) PIPE LAYING TOOL

(75) Inventor: Allen A. Waggoner, Salida, CA (US)

(73) Assignee: M&W Hook Enterprises, Turlock, CA (US)

( * ) Notice: Subject to any disclaimer, the term of this patent is extended or adjusted under 35 U.S.C. 154(b) by 0 days.

(21) Appl. No.: 09/277,467

(22) Filed: Mar. 26, 1999

(51) Int. Cl.$^7$ ..................................................... B66F 11/04
(52) U.S. Cl. ............................. 414/745.4; 414/745.7; 414/746.5; 414/685; 414/910; 294/67.2; 294/67.21; 37/906
(58) Field of Search ........................ 294/67.2, 67.21, 294/68.22; 414/745.4, 745.6, 745.7, 746.5, 745.5, 910, 685, 722; 37/906

(56) References Cited

U.S. PATENT DOCUMENTS

| | | | |
|---|---|---|---|
| Re. 32,532 | 10/1987 | Sonerud | 414/747 |
| 1,844,385 | * 2/1932 | Goldsmith | 414/745.4 |
| 2,881,928 | 4/1959 | Morris | 214/1 |
| 3,561,615 | * 2/1971 | Forsberg | 414/745 |
| 3,834,566 | 9/1974 | Hilfiker | 215/138 |
| 3,958,704 | 5/1976 | Wire et al. | 214/130 |
| 3,989,150 | 11/1976 | Stephenson et al. | 214/147 G |
| 4,362,435 | 12/1982 | Henry | 405/154 |
| 4,480,942 | 11/1984 | Farrow | 405/154 |
| 4,682,912 | * 7/1987 | Henry | 414/745 |
| 4,934,897 | 6/1990 | Anderson et al. | 414/694 |
| 5,232,502 | 8/1993 | Recker | 118/317 |
| 5,522,699 | * 6/1996 | Smith | 414/745.4 |
| 5,688,009 | * 11/1997 | Pienta | 294/67.2 |
| 5,707,175 | * 1/1998 | Geelhoed | 414/745.4 |

* cited by examiner

Primary Examiner—Joseph A. Fischetti
(74) Attorney, Agent, or Firm—Pillsbury Winthrop LLP; David H. Jaffer

(57) ABSTRACT

A tool for attachment to a working end of an excavator arm for use in supporting a pipe section while lowering it into a trench. The tool has a proximal end from which extends an elongated arm, held in an approximately horizontal position when in use. A vertical riser is attached to the arm at the proximal end, and an upper end of the riser is attached to a quick coupling connector for attachment to a corresponding mating quick coupling on the working end of an excavator arm. A lateral support, extending from each side of the tool is included, making the tool self supporting in a vertical position on level ground in a position ready for connection to an excavator arm. A further embodiment includes the combination of the tool as described above with a leveling device attached to an excavator, a combination that provides precision alignment and joining of pipe lengths in a trench.

1 Claim, 4 Drawing Sheets

Section A

PIPE LAYING TOOL

BACKGROUND OF THE INVENTION

1. Field of the Invention

The present invention relates generally to pipe laying equipment, and more particularly to a tool for use with an excavator for supporting a length of pipe while lowering the pipe into a trench and connecting it to a second length of pipe.

2. Brief Description of the Prior Art

The process of laying sections of pipe for an underground pipe line involves first digging a trench to the required depth. A heavy mobile piece of equipment known as an excavator is then typically used to lower a section of pipe into the trench. The pipe is secured to an end of an arm or boom of the excavator with chains and C-hooks.

A disadvantage of this method is that it is necessary to place a worker in the trench to guide the newly lowered section of pipe into contact with a previously installed section. The worker must also disengage the C-hooks and chains from the pipe. The task of manipulating the pipe in the trench is not without some hazard, due in part to the weight of the pipe and excavator arm. In deep trenches, the additional hazard of possible collapse of the trench walls must be carefully guarded against for the safety of the trench worker. In cases where there is danger of wall collapse, shoring is often put in place to support the soil. The shoring must then be removed and reinstalled for the process of laying the next section or sections of pipe, etc.

U.S. Pat. No. 5,232,502 by Recker describes an apparatus designed to lay pipe with an excavator without the need for a worker in the trench. A horizontally positioned arm 78 is suspended from the working end of an excavator boom assembly, attached with a rotary coupler 76 (FIG. 2 and col. 3, lines 31–32). In order to avoid the need for a worker in the trench to apply pipe sealant, a sealant is forced through the rotary coupler and sprayed from the end of the horizontal arm. The apparatus as described has some disadvantages and is not in common use. The rotary coupler with conduit is not a standard quick coupler, and requires special modification of the excavator. Connecting the horizontal arm 78 and conduit requires a second worker, or alternatively the excavator operator has to leave the cab to manually perform the operation. Positioning the arm 78 and support beam 80 in the process of connecting the tool to the excavator arm assembly is also a problem due to the weight of the tool, and the fact that without other support, the tool could only lay on the ground, 90 degrees disoriented, requiring an operator, probably with additional equipment to lift it into position for connecting to the excavator coupling device 70. In addition, the rotary connection 76 is not durable enough to withstand repeated use, or rigid enough to allow undesired rotation of a pipe placed on the arm 78. For example, a typical eight foot section of 54 inch diameter concrete pipe weighs about 1370 pounds per foot, or a total of 10,960 pounds. A much more rigid and strong connection is required for practical use.

It is apparent that an improved tool and method of laying pipe is needed that keeps workers out of the pipe trench, and that is robust and can be used with a standard excavator arm quick coupling device.

SUMMARY

It is therefore an object of the present invention to provide a tool for use in lowering a section of pipe into a trench that avoids the use of chains and c-hooks that must be removed by a trench worker.

It is another object of the present invention to provide a tool for laying pipe that is rugged in construction and that can be attached to the working end of an excavator boom assembly by an excavator operator without leaving the excavator cab.

It is a further object of the present invention to provide a tool that facilitates the joining of pipe sections without the need for a trench worker.

Briefly, a preferred embodiment of the present invention includes a tool for attachment to a working end of an excavator arm for use in supporting a pipe section while lowering it into a trench. The tool has a proximal end from which extends an elongated arm, held in an approximately horizontal position when in use. A vertical riser is attached to the arm at the proximal end, and an upper end of the riser is attached to a quick coupling connector for attachment to a corresponding mating quick coupling on the working end of an excavator arm. A lateral support, extending from each side of the tool is included, making the tool self supporting in a vertical position on level ground in a position ready for connection to an excavator arm. The present invention further includes the combination of the tool with a leveling device attached to an excavator, a combination that provides precision alignment and joining of pipe lengths in a trench.

An advantage of the tool of the present invention is that it allows a pipe to be positioned in a trench with improved accuracy.

A further advantage of the tool of the present invention is that it allows a pipe supported by the tool to be joined to another pipe in a trench without the need for a trench worker.

A still further advantage of the present invention is that it reduces worker injury by avoiding the need for a worker in the trench during the pipe laying operation.

Another advantage of the present invention is that it provides a pipe laying tool that is self supporting, and does not require an excavator operator to leave the excavator cab to connect the tool.

IN THE DRAWING

DETAILED DESCRIPTION OF THE PREFERRED EMBODIMENT

Figure 1:
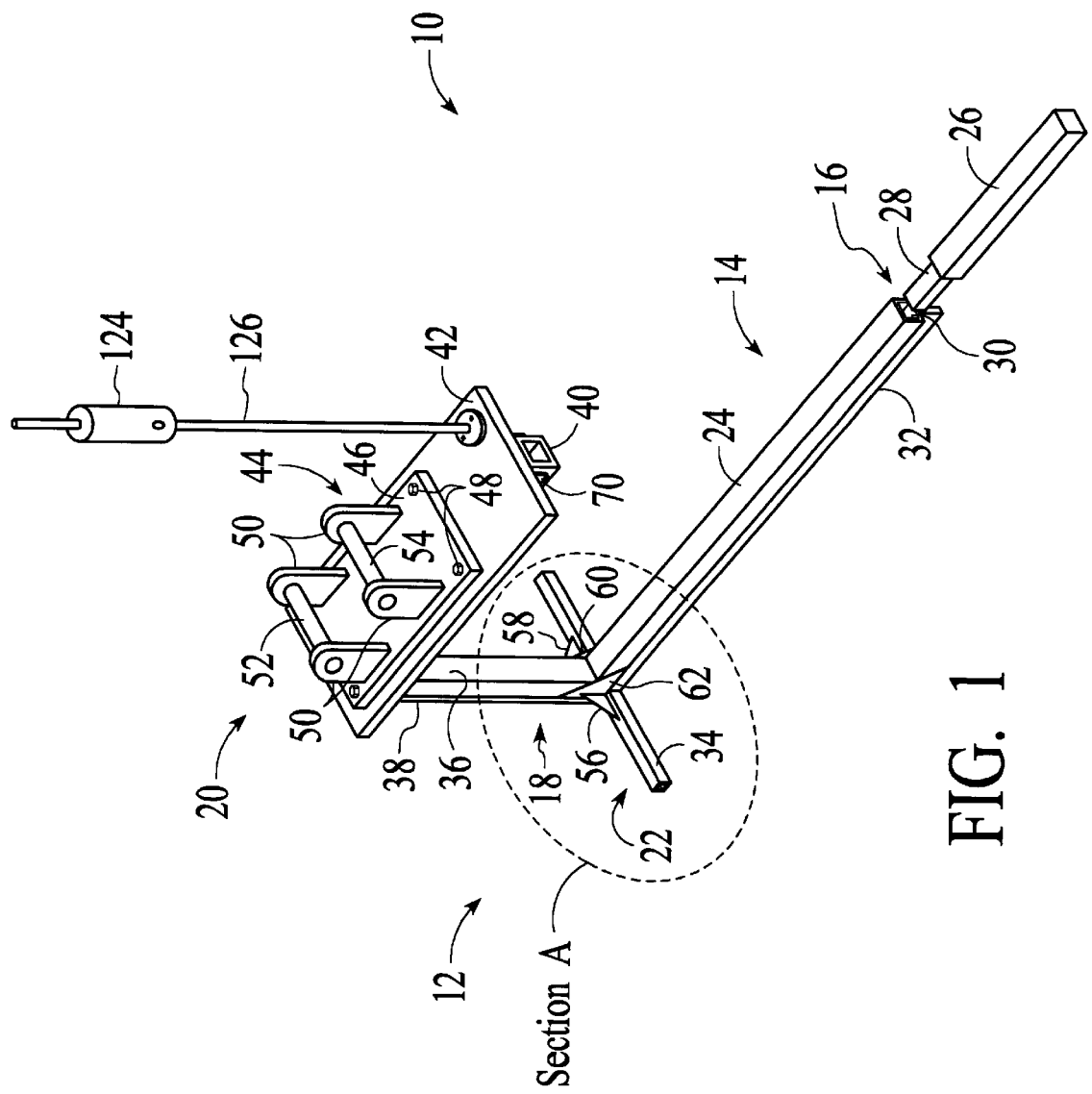
FIG. 1 is a perspective view of the pipe laying tool of the present invention.
Figure 2:
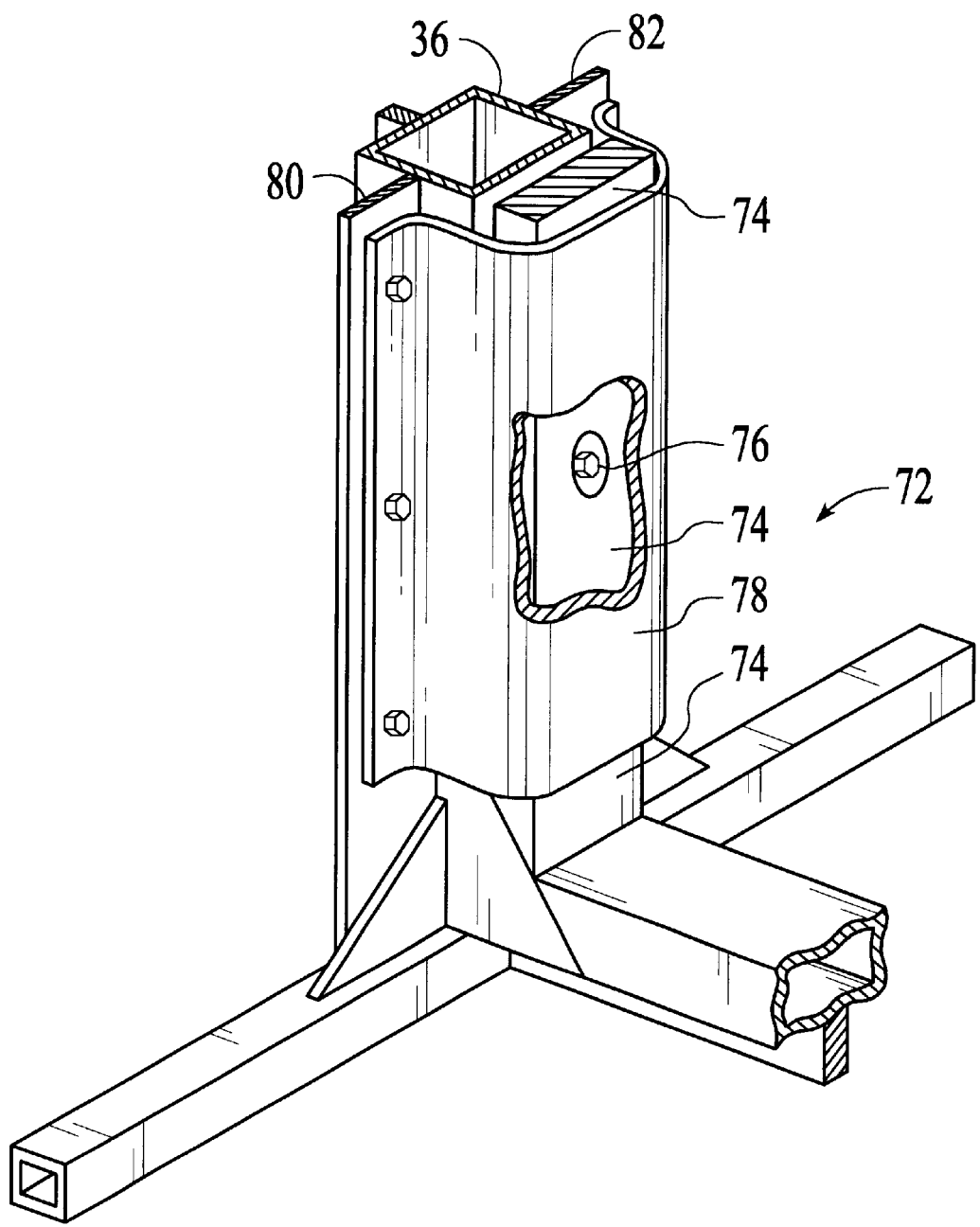
FIG. 2 shows an absorptive buffer mounted to a riser.

The preferred embodiment of the pipe laying tool 10 of the present invention is shown in the perspective views of FIGS. 1 and 2. Referring to FIG. 1, the tool 10 has a proximal end 12, to which is attached a horizontal tool arm 14 extending horizontally in operation to a distal end 16. The arm 14 is connected at the proximal end of the tool to a vertical riser 18, in turn attached to a coupling assembly 20. A lateral support 22 allows the tool 10 to stand unsupported, facilitating the process of connecting the tool to a working end of an excavator arm.

As shown in FIG. 1, the arm 14 includes a length 24 of 4×4 inch×0.5 inch rectangular tubing about 6 feet long. The length can be longer or shorter depending on the length of pipe to be installed. Optionally, as an alternate embodiment, a pipe extension 26 is included in the tool 10. The extension has a reduced size section 28 for insertion in the hollow center 30 of tube 24 for use in accommodating somewhat longer pipe. A 1.25×2.0 inch bar 32 is welded to the bottom of the tube 24 for increased strength, and extends over the majority of the arm 14 length to the lateral support 22 including a stabilization bar 34, constructed from a 30 inch length of 2.0×2.0×0.25 inch wall tubing. The riser 18 is similarly constructed from a 28 inch length of 4×4×0.5 inch tubing 36, braced with a 34 inch long piece of 0.75×5.0 inch flat bar 38.

A support bar 40 of 4×4×0.5 inch tubing by 51.5 inches long is welded to the top end of tube 36, and provides strength to the coupling assembly 20. A 1.5 inch thick support plate 42, measuring about 24 inches wide by 27 inches long is welded to the tube 40. The assembly 20 includes a coupling connector 44 with a connector plate 46 secured to support plate 42 with bolts 48 or by welding, and supports 50 for positioning coupling bars 52 and 54.

Figure 3:
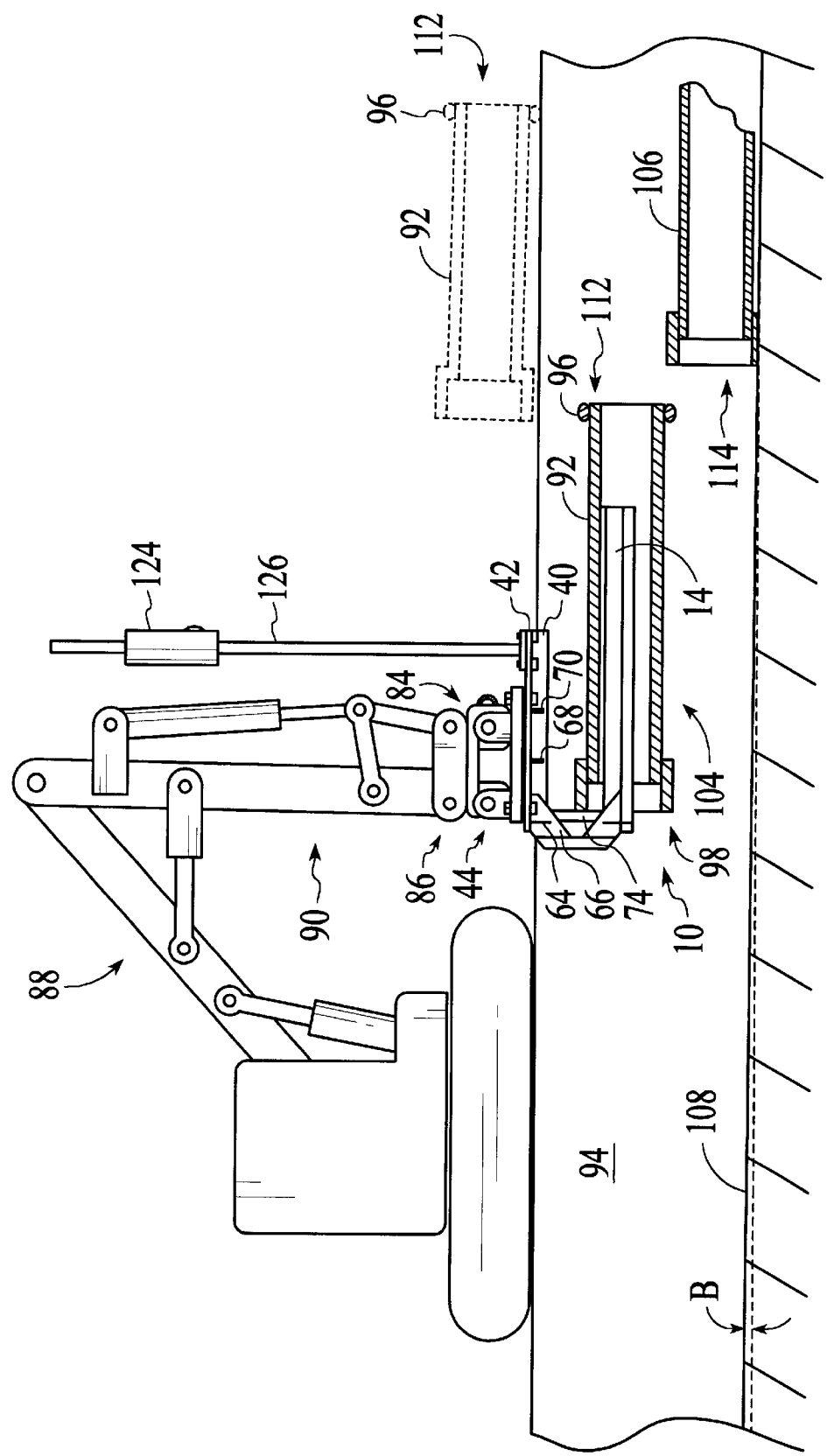
FIG. 3 illustrates the use of the tool to place a pipe in a trench.

The various elements 24, 34, 36, 40, and 42 described above are welded together along with triangular support members 56, 58, 60, 62 for strength. Similarly, triangular support members 64, 66, 68 and 70, shown in FIG. 3, and corresponding supports on the opposite side of tube 40 are welded between plate 42 and tube 40, and between tube 40 and tube 36 as shown in FIGS. 1, 2 and 3. A laser receiver 124 and pole 126 are shown mounted to plate 42. The function of this apparatus will be fully explained in the following description in reference to FIG. 4.

In order to minimize the probability of damaging the pipe while applying horizontally directed force to engage one section of pipe with another, an absorptive bumper 72 is attached to the riser tube 36 facing the distal end 16. The bumper apparatus is illustrated in section A of FIG. 2. The bumper 72 preferably includes a 2×4 inch board 74 attached to riser tube 36 with bolts 76, countersunk into the board 74 as shown in FIG. 2. In order to further cushion the end of the pipe, a rubber sheet 78 is placed over the board 74 as shown in FIG. 2. The sheet 78 is bolted to two plates 80, 82 welded with one on each side of riser tube 36. The bumper assembly, including plates 80 and 82 are part of the tool of FIG. 1, but not shown in that figure for the purpose of clarity of illustration.

Alternative construction methods and materials will be apparent to those skilled in the art, and these are included in the spirit of the present invention. For example, the rectangular tubes shown in FIGS. 1 and 2 could be constructed from round tubing or I-beam shaped material. The supports to be described could alternatively be tubular lengths of material, or even omitted if enough strength is otherwise designed into the structure. The coupling assembly 20 could include a single piece platform welded to the riser 18.

Referring now to FIG. 3, the tool 10 is shown with the connector 44 engaged with a corresponding mating connector 84 attached to the working end 86 of excavator 88 arm assembly 90. In operation, the tool 10 is attached to the working end 86 of the excavator 88. At any time prior to moving a section of pipe such as 92 (dashed lines) into the trench 94 as shown in FIG. 3, a gasket 96 is placed on the pipe plug end 112. The excavator 88 is then operated to insert the tool arm 14 inside the length of pipe 92 as it lays outside the trench 94. FIG. 3 then shows the pipe 92 at position 104, being lowered down into the trench 94. Lowering and positioning of the pipe 92 continues until the pipe 92 is in alignment with a previously laid section of pipe, such as 106 on the bottom 108 of the trench 94. The positioning then includes joining the pipe section 92 to the previously laid section of pipe 106. The bumper 72 provides a cushioned contact against the end 98 of pipe 92 as the end 112 of pipe 92 is inserted into the joining end 114 of pipe 106.

Figure 4:
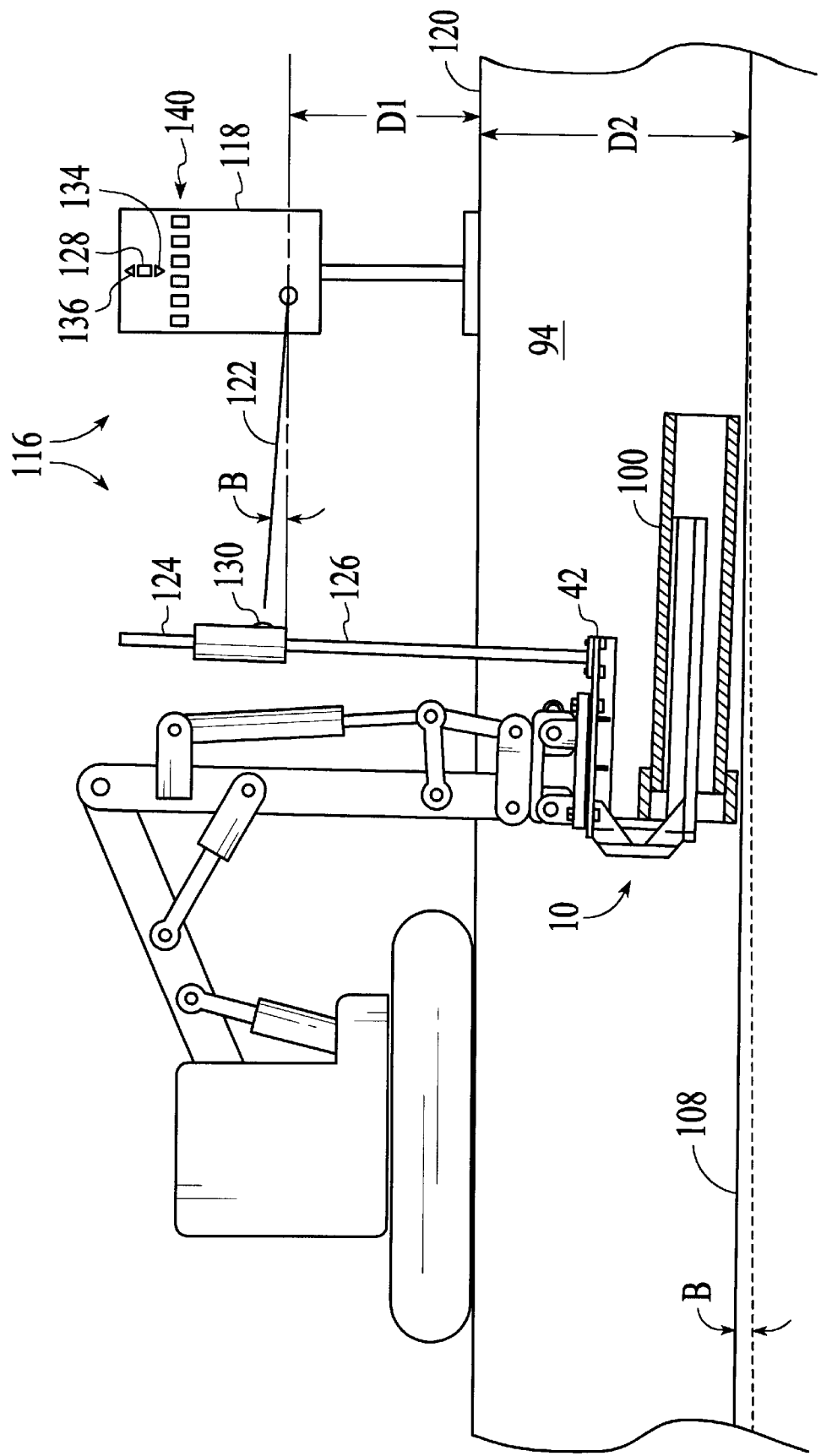
FIG. 4 illustrates the use of the tool in combination with an excavator and positioning device for laying a section of pipe in a trench.

Referring to FIG. 4, according to the preferred embodiment of the method and apparatus of the present invention, the tool 10 is accompanied by a laser positioning apparatus 116. An example of such an apparatus is a device called a Depth Master, manufactured by a company known as Laser Alignment. The apparatus includes a laser transmitter 118 positioned a distance D1 above surface 120 and adjusted to transmit a reference laser beam 122 at the required slope B. A laser receiver 124 is slideably attached to a pole 126 shown attached to the tool 10 plate 42.

1 The transmitter 118 has a light 128 that turns on when the beam 122 is intercepted by the receiver 124 detector 130. If the detector 130 is below the line 122, a light 134 turns on, and if the detector is above the beam 122, light 136 turns on. In operation, the transmitter 118 is adjusted so that the beam 122 is at an angle B equal to the desired slope of the pipe and trench bottom 108. FIG. 4 shows a preferred method of adjusting the receiver 124 position on the pole 126 so that when pipe 92 arrives at the proper depth, the light 128 goes on. This is done by lowering a section of pipe 100 into the trench 94 until the pipe 100 just contacts the bottom 108. The receiver 124 is then positioned on the pole 126 so that beam 122 is intercepted by the receiver detector 130. The excavator and tool are then used to lay pipe as follows: Assume pipe 100 is laid in position as shown and a second pipe section is picked up by the tool 10. The excavator is backed up with the second pipe so that when it is lowered it will clear pipe 100. It is then lowered into the trench until the light 128 goes on. The excavator then moves forward with the second pipe, adjusting as required to keep the light 128 on, assuring that the second pipe is in alignment with pipe 100, and allowing the second pipe to join properly with pipe 100. In other words, the distance from the beam to the bottom of the trench is a constant, and the depth measurement equipment assures that the pipe is at that depth when the excavator operator attempts to join the two pipe sections together. The transmitter 118 has a second set of lights 140 that gives the operator a visual indication of the vertical alignment of the receiver 124 and therefore pole 126. As used in the present invention, this vertical alignment indicator 140 indicates to an excavator operator whether or not a pipe being held by the tool 10 is in a horizontal, or near horizontal position since the slope B is generally very small, as required for proper mating with a previously laid section of pipe.

Other depth measuring apparatus are also included in the spirit of the present invention. For example, an apparatus using encoders is available. The position of the tool arm 12 relative to a reference such as ground level 108 is determined by the position detection apparatus which includes a processor and monitor for calculating and displaying the position. The calculation is based on signals received from encoders located on the excavator boom assembly to detect the assembly position. The encoders and position monitoring equipment are currently known in the art and applied for positioning shovels mounted on the working end of an excavator arm assembly. The technology of depth detection can be applied to the positioning of a section of pipe as explained above. It is apparent then, that those skilled in the art will know how to apply the technology to measure the depth of the pipe according to the present invention after reading the present disclosure, and a detailed description of the prior art apparatus and how it is used is therefore not included.

Although the present invention has been described above in terms of a specific embodiment, it is anticipated that alterations and modifications thereof will no doubt become apparent to those skilled in the art. It is therefore intended that the following claims be interpreted as covering all such alterations and modifications as fall within the true spirit and scope of the invention.

It is claimed that:

1. A tool for laying a section of pipe comprising:
   (a) a tool arm having a proximal end and a distal end, said arm for insertion in said section of pipe;
   (b) a lateral support extending from said proximal end, said lateral support forming a T-shape with said tool arm, said T-shape defining a plane of support for standing said tool on a surface;
   (c) a riser extending upward from said lateral support to an upper end of said riser; and
   (d) a coupler attached to said riser for connecting said tool to a working end of an excavator arm assembly, said coupler including
      (i) a plate attached to said upper end of said riser, said plate oriented in a plane substantially parallel to said plane of support of said support structure;
      (ii) first and second loop shaped coupling sections attached to a top surface of said plate, each section having a length of rod supported apart from said plate apparatus.

* * * * *